(12) United States Patent
Youdale et al.

(10) Patent No.: US 10,568,016 B2
(45) Date of Patent: Feb. 18, 2020

(54) SYSTEMS AND METHODS FOR PROCESSING DORMANT VIRTUAL ACCESS DEVICES

(71) Applicant: VISA INTERNATIONAL SERVICE ASSOCIATION, San Francisco, CA (US)

(72) Inventors: Robert Youdale, Burlingame, CA (US); Shalini Mayor, Foster City, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 0 days.

(21) Appl. No.: 15/976,429

(22) Filed: May 10, 2018

(65) Prior Publication Data

US 2018/0262970 A1 Sep. 13, 2018

Related U.S. Application Data

(63) Continuation of application No. 15/130,854, filed on Apr. 15, 2016, now Pat. No. 9,998,978.

(Continued)

(51) Int. Cl.
*G06F 15/16* (2006.01)
*H04W 48/02* (2009.01)
(Continued)

(52) U.S. Cl.
CPC ............ *H04W 48/02* (2013.01); *H04W 4/50* (2018.02); *H04L 63/108* (2013.01); *H04L 67/34* (2013.01)

(58) Field of Classification Search
CPC ...... H04W 48/02; H04W 4/50; H04L 63/108; H04L 67/34
See application file for complete search history.

(56) References Cited

U.S. PATENT DOCUMENTS 5,613,012 A 3/1997 Hoffman
5,781,438 A 7/1998 Lee
(Continued)

FOREIGN PATENT DOCUMENTS

EP 2156397 A1 2/2010
WO 2001035304 A1 5/2001
(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
(Continued)

*Primary Examiner* — Jonathan A Bui
(74) *Attorney, Agent, or Firm* — Kilpatrick Townsend & Stockton LLP

(57) ABSTRACT

Embodiments of the invention are directed to ceasing the renewal of a virtual access device that is dormant. Some embodiments may receive a dormancy request from an authorization server, where the dormancy request includes information identifying a virtual access device. Embodiments may determine that the virtual access device is dormant based at least on previous transactions involving the virtual access device and at least one dormancy rule. Certain embodiments may send a dormancy response to the authorization server indicating that the virtual access device is dormant. An authorization server may determine not to renew a virtual access device based at least upon the dormancy response. As such, the authorization server need not provision a mobile device with an updated virtual access device.

19 Claims, 7 Drawing Sheets

Related U.S. Application Data

(60) Provisional application No. 62/148,642, filed on Apr. 16, 2015.

(51) Int. Cl.
  *H04W 4/50* (2018.01)
  *H04L 29/08* (2006.01)
  *H04L 29/06* (2006.01)

(56) References Cited

U.S. PATENT DOCUMENTS

| | | |
|---|---|---|
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III et al. |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,132,723 B2 | 3/2012 | Hogg et al. |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |

(56) References Cited

U.S. PATENT DOCUMENTS

| | | |
|---|---|---|
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0140146 A1 | 7/2003 | Akers et al. |
| 2003/0172335 A1 | 9/2003 | Sharma |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0088948 A1 | 4/2007 | Ji et al. |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0249063 A1 | 10/2009 | Sakurai et al. |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |

(56) References Cited

U.S. PATENT DOCUMENTS

| | | |
|---|---|---|
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0159483 A1* | 6/2012 | He .................. H04L 67/12 718/1 |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111076 A1 | 5/2013 | Vaynberg et al. |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |

(56) References Cited

U.S. PATENT DOCUMENTS

| | | |
|---|---|---|
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0068725 A1 | 3/2014 | Zhang et al. |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0165060 A1* | 6/2014 | Muller .............. G06F 9/5022 718/1 |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0175178 A1 | 6/2015 | Ignatius et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0195176 A1 | 7/2015 | Vasseur et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0288694 A1* | 10/2015 | Liebl, III ............... G06F 21/31 713/182 |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0021194 A1 | 1/2016 | Prabhakar et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0147560 A1 | 5/2016 | Jolfaei et al. |
| 2016/0148197 A1 | 5/2016 | Dimmick |
| 2016/0148212 A1 | 5/2016 | Dimmick |
| 2016/0171435 A1* | 6/2016 | Newton ............ G06Q 10/0833 705/333 |
| 2016/0171479 A1 | 6/2016 | Prakash et al. |
| 2016/0173483 A1 | 6/2016 | Wong et al. |
| 2016/0210628 A1 | 7/2016 | McGuire |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232527 A1 | 8/2016 | Patterson |
| 2016/0239842 A1 | 8/2016 | Cash et al. |
| 2017/0046696 A1 | 2/2017 | Powell et al. |
| 2017/0103387 A1 | 4/2017 | Weber |
| 2017/0150549 A1 | 5/2017 | Olsson et al. |
| 2017/0220818 A1 | 8/2017 | Nagasundaram et al. |
| 2017/0228723 A1 | 8/2017 | Taylor |
| 2017/0364422 A1* | 12/2017 | Antony ............... G06F 11/203 |
| 2018/0088979 A1* | 3/2018 | Jiang ................... G06F 9/45558 |
| 2019/0025903 A1* | 1/2019 | Mehta .................. G06F 1/3287 |
| 2019/0056969 A1* | 2/2019 | Khandros ............ G06N 20/00 |
| 2019/0065230 A1* | 2/2019 | Tsirkin ................ G06F 9/45558 |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Chipman, et al., U.S. Appl. No. 15/265,282 (Unpublished), Self-Cleaning Token Vault, filed Sep. 14, 2016.

Lopez, et al., U.S. Appl. No. 15/462,658 (Unpublished), Replacing Token on a Multi-Token User Device, filed Mar. 17, 2017.

Wang, U.S. Appl. No. 62/000,288 (unpublished), Payment System Canonical Address Format filed on May 19, 2014.

Sharma et al., U.S. Appl. No. 62/003,717 (unpublished), Mobile Merchant Application filed on May 28, 2014.

Kalgi et al., U.S. Appl. No. 62/024,426, (unpublished) Secure Transactions Using Mobile Devices filed on Jul. 14, 2014.

Prakash et al., U.S. Appl. No. 62/037,033 (unpublished), Sharing Payment Token filed on Aug. 13, 2014.

Hoverson et al., U.S. Appl. No. 62/038,174 (unpublished), Customized Payment Gateway filed on Aug. 15, 2014.

Wang, U.S. Appl. No. 62/042,050 (unpublished), Payment Device Authentication and Authorization System filed on Aug. 26, 2014.

Gaddam et al., U.S. Appl. No. 62/053,736 (unpublished), Completing Transactions Without a User Payment Device filed on Sep. 22, 2014.

Patterson, U.S. Appl. No. 62/054,346 (unpublished), Mirrored Token Vault filed on Sep. 23, 2014.

(56) References Cited

OTHER PUBLICATIONS

Stubbs et al., U.S. Appl. No. 62/103,522 (unpublished), Methods and Systems for Wallet Provider Provisioning filed on Jan. 14, 2015.
Flurscheim et al., U.S. Appl. No. 62/108,403 (unpublished), Wearables With NFC HCE filed on Jan. 27, 2015.
Kinagi, U.S. Appl. No. 62/117,291 (unpublished), Token and Cryptogram Using Transaction Specific Information filed on Feb. 17, 2015.
Galland et al. U.S. Appl. No. 62/128,709 (unpublished), Tokenizing Transaction Amounts filed on Mar. 5, 2015.
Rangarajan et al., U.S. Appl. No. 61/751,763 (unpublished), Payments Bridge filed on Jan. 11, 2013.
Li, U.S. Appl. No. 61/894,749 (unpublished), Methods and Systems for Authentication and Issuance of Tokens in a Secure Environment filed on Oct. 23, 2013.
Aissi et al., U.S. Appl. No. 61/738,832 (unpublished), Management of Sensitive Data filed on Dec. 18, 2012.
Powell, U.S. Appl. No. 61/892,407 (unpublished), Issuer Over-The-Air Update Method and System filed on Oct. 17, 2013.
Powell, U.S. Appl. No. 61/926,236 (unpublished), Methods and Systems for Provisioning Mobile Devices With Payment Credentials and Payment Token Identifiers filed on Jan. 10, 2014.
U.S. Appl. No. 15/130,854 , "Non-Final Office Action", dated Nov. 17, 2017, 7 pages.

\* cited by examiner

SYSTEMS AND METHODS FOR PROCESSING DORMANT VIRTUAL ACCESS DEVICES

CROSS-REFERENCES TO RELATED APPLICATIONS

This application is a continuation of U.S. patent application Ser. No. 15/130,854, filed Apr. 15, 2016, which is a non-provisional application of and claims the benefit of priority to U.S. Provisional Application No. 62/148,642, filed on Apr. 16, 2015, which is herein incorporated by reference in its entirety for all purposes.

BACKGROUND

Mobile phones can utilize access data to obtain access to a resource or a location. For example, a mobile phone may include data which is passed to an access device to allow the user of the mobile phone to access a room in a building. In another example, the mobile phone may have access data such as account data which may allow the user of the mobile phone to access an account to obtain a good.

In many cases, a resource provider may provide a consumer with access data that can be embedded on a physical access device, such as a physical card, a physical key, or a physical RFID tag. In some instances, the resource provider may also provision the mobile phone with the access data. For example, a building operator system or a transit system may provision a mobile phone with data that allows a user of the mobile phone to access a building or access a turnstile. In another example, a bank may provision the mobile phone with access data that allows the user of the mobile phone to access an account at the bank.

In instances where the mobile phone may be provisioned with the access data, a user can choose to have a mobile application and a virtual access device (e.g., a virtual payment device) provisioned onto the mobile device. Typically, the virtual access device is associated with a physical access device. In some instances, when the physical access device is renewed, any corresponding virtual access devices may also need to be renewed in order to remain usable.

This routine of renewing virtual access credentials for mobile devices whenever corresponding physical access devices are renewed poses several problems. For example, if the user has deleted the mobile application or has switched to a different mobile device, renewing the virtual access device may fail. A provisioning system may retry provisioning the renewed virtual access device several times before aborting. This can cause ineffective use of limited processing power. If virtual access devices are renewed in batch, this effect can compound to cause a significant load and potentially system failure. The systems of the resource providers can crash due to peak load during which too many renewal requests have failed and entered into a systematic retry process (e.g., due to users changing phones).

Without addressing these dormant access devices, the system (e.g., an issuer) may become overloaded from processing an overwhelmingly large number of re-provisioning attempts. There is a need to reduce the number of unnecessary renewals to minimize system overloading and to minimize delays on renewing those virtual access devices that need to be renewed.

Embodiments of the present invention are directed to methods and systems of minimizing system overload and infrastructure failures. Embodiments of the invention address this and other problems, individually and collectively.

BRIEF SUMMARY

Embodiments of the invention are directed to methods and systems that improve hardware resource usage and allocation by minimizing unnecessary reprovisioning attempts of dormant virtual access devices on user mobile devices.

Some embodiments provide techniques for identifying dormant virtual access devices (e.g., dormant virtual payment cards) that need not be renewed to minimize failed renewal requests. In some embodiments, a server may receive a dormancy request from an issuer server where the dormancy request includes information identifying a virtual payment device. The server may determine that the virtual payment device is dormant based on previous transactions involving the virtual payment device and at least one dormancy rule. In certain embodiments, the server may send a dormancy response to the issuer server indicating that the virtual payment device is dormant. From the dormancy response, the issuer server may determine to close the dormant virtual payment device instead of making attempts to provision a renewed virtual payment device on a user mobile device.

Identifying dormant virtual payment devices that need not be renewed can minimize failed provisioning attempts, as the user may have changed phones or deleted the mobile application, etc. Embodiments need not waste hardware resources to make unnecessary provisioning and reprovisioning attempts. Further, as there have been wide instances of issuers crashing due to peak load during which too many renewal requests have failed and entered into a systematic retry process, eliminating the need to send large numbers of renewal requests to various user mobile devices may dramatically reduce the processing load on the payment processor and issuer servers.

One embodiment of the invention is directed to a method of receiving, by a server computer, a dormancy request from an issuer computer, the dormancy request including information identifying a virtual payment device. The server computer may then determine that that the virtual payment device is dormant based on previous transactions involving the virtual payment device and at least one dormancy rule. The server computer may then send a dormancy response to the issuer computer indicating the that virtual payment device is dormant.

Further details regarding embodiments of the invention can be found in the Detailed Description and the Figures.

DETAILED DESCRIPTION

Figure 1:
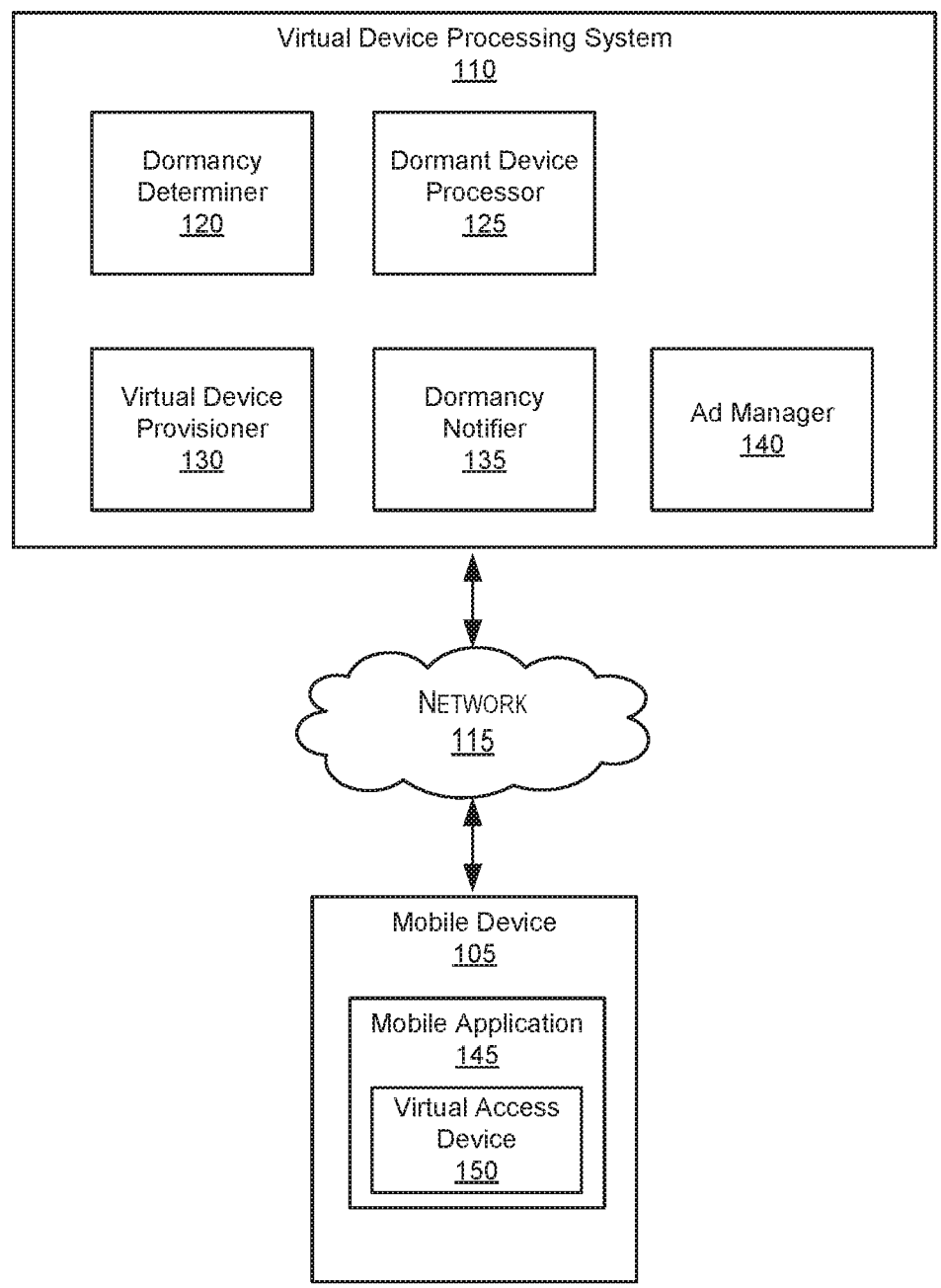
FIG. 1 illustrates a simplified block diagram of an example computing environment 100 in accordance with certain embodiments of the invention.

In the past few years, mobile wallets have been gaining popularity. Wallet providers enable users to use virtual cards at access points by provisioning virtual cards onto the users' devices. Users may download a mobile application that allow users to install one or more cards onto the mobile application. The users may then make a payment at certain point of sale (POS) locations by pulling up a virtual card installed on the user's mobile device. In some instances, the user may gain access at an entry point by interfacing a virtual card installed on the user's mobile device with a reader at the entry point.

Similar to physical cards, virtual cards are renewed periodically to minimize the risk of fraud. In some instances where a virtual card has previously been provisioned onto the mobile device, the user may no longer be using the virtual card. The user may not be using the virtual card for many reasons, including a switch in mobile devices, having deleted the application, etc. As the issuers attempt to re-provision renewed virtual cards onto user devices that for example no longer exist or no longer have the mobile wallet application can cause system overload. The massive number of renewal requests can cause the infrastructure sending those requests to get into an enormous loop that cannot be handled at the peak performance load.

Embodiments of the invention can provide techniques for minimizing auto-renewal of a dormant virtual card if the renewal is unneeded. By identifying those dormant virtual cards that need not be auto-renewed, embodiments can minimize failed provisioning attempts and loads on provisioning servers. In some embodiments, dormant virtual cards can be identified by monitoring the activity level of a virtual card provisioned on a mobile device. Some embodiments may determine that renewal of a dormant virtual card is not needed when it is unlikely that the user will use the virtual card. Certain embodiments may then close the virtual card or re-engage customers by sending offers, etc.

In some embodiments, a dormant virtual card need not be renewed because, for example, the user may have changed phones where the virtual card provisioned on the previous phone has not been reprovisioned on the current phone, the user may have deleted an application from which the user could access and use the virtual payment device, and that the user is not transacting with the virtual payment device. By identifying these dormant virtual cards, some embodiments need not waste the resources to make unnecessary provisioning attempts for a renewed virtual device when it is unlikely that the user will use the renewed virtual device. Further, by identifying these devices in large numbers and eliminating the need to send large numbers of renewal requests, some embodiments may minimize the load and overhead processing failures at the issuer's processing devices.

Prior to discussing specific embodiments of the invention, some terms may be described in detail.

As used herein, a "mobile device" may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, wearable devices (e.g., watches), vehicles (e.g., cars), etc. A mobile device may comprise any suitable hardware and software for performing such functions, and may also include multiple devices or components (e.g., when a device has remote access to a network by tethering to another device—i.e., using the other device as a relay—both devices taken together may be considered a single mobile device).

The term "server computer" may include a powerful computer or cluster of computers. For example, the server computer can be a large mainframe, a minicomputer cluster, or a group of servers functioning as a unit. In one example, the server computer may be a database server coupled to a Web server. Other examples of the server computer may include an application server, a file server, a mail server, a print server, a gaming server, etc. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some contexts, the server computer can refer to an application that executes and operates as a server according to a client-server protocol. In certain contexts, the server computer may refer to computing hardware that can or does execute a server application.

A "provisioning server computer" may include any suitable computer that can provision access data to a device.

"Access data" may include any suitable data that can be used to access a resource or create data that can access a resource. In some embodiments, access data may be account information for a payment account. Account information may include a PAN, payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. This specific information may be characterized as access information in some embodiments. In other embodiments, access data could include data that can be used to access a location. Such information may be ticket information for an event, data to access a building, transit ticket information, etc. Access data can be part of a physical access device or a virtual access device.

A "physical access device" may be a physical device for enabling access to goods or services. The physical access device may be a hardware object or a physical object. As examples of physical objects, the access device may comprise a substrate such as a paper or plastic card, and information that is printed, embossed, encoded, or otherwise included at or near a surface of an object. A hardware object can relate to circuitry (e.g., permanent voltage values). An example of a physical access device is a physical payment device such as a physical credit card, an RFID tag, etc. A physical payment device may be used to make a payment transaction and may be associated with a value such as a monetary value, a discount, or store credit. A physical payment device may be associated with an entity such as a bank, a merchant, a payment processing network, or a person. Another example of a physical access device is a physical pass such as a bus pass, a ticket, a transit card, or any other types of device that allows a user to gain access to an establishment, a location, an event, or a service. In some instances, a physical access device may include access data or a token that allows a user to obtain access to a building, a location, goods, and/or services.

A "virtual access device" may be a virtual device for enabling access to goods or services. The virtual access device may be a software object (e.g., access data). A software object can relate to non-permanent data stored on a device such as a mobile phone, a tablet, etc. An example of a virtual access device is a virtual payment device. A virtual payment device may be associated with a value such as a monetary value, a discount, or store credit, and a virtual payment device may be associated with an entity such as a bank, a merchant, a payment processing network, or a person. A virtual payment device may be used to conduct a payment transaction, e.g., via a payment reader at a POS. In another example, a virtual payment device can include a tokenized version of a physical payment card's payment credentials. Another example of a virtual access device is a virtual pass such as credit, credentials, or other types of digital data (e.g., e-ticket) that can be stored on a device such as a mobile phone. The virtual pass may be used to enable a user to gain access to an establishment, a location, an event, or a service. A virtual access device may be associated with a physical access device. For example, a virtual payment device can include the same payment credentials (e.g., primary account number, expiration date, CVV) as a physical payment device. There can be a physical access device that corresponds to the virtual access device where both devise have similar or the same credentials. Both devices may be used by a user to obtain access to a location, a building, an event, a service, etc. In some instances, a virtual access device may refer to access data or a token that allows a user to obtain access to a building, a location, goods, and/or services.

An "application" may be a computer program that is used for a specific purpose.

An "access point device" may be any suitable device for obtaining access to a resource. An access point device may generally be located in any suitable location, such as at the location of a merchant. An access point device may be in any suitable form. Some examples of access point devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access point device may use any suitable contact or contactless mode of operation to send or receive data from, or associated with, an access device (e.g., physical or virtual access device) and/or a user mobile device. In some embodiments, where an access point device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

A "transaction processing network" may include a network that can process and route transaction request messages. An exemplary transaction processing network may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services. There can be transaction processing networks for a payment organization, a transit authority, a building system, a ticketing system, etc.

An "authorization request message" may be an electronic message that is a request to authorize a transaction. In some embodiments, it is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it is generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "token" may refer to a substitute identifier for some information. For example, a transaction token may include an identifier for a transaction account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "token service provider" may refer to an entity including one or more server computers in a token service system that generates, processes, and maintains tokens. The token service provider may include or be in communication with a token vault where the generated tokens are stored. Specifically, the token vault may maintain one-to-one mapping between a token and the data (e.g., a real account identifier) represented by the token. A token service provider may provide reports or data output to reporting tools regarding approved, pending, or declined token requests, including any assigned token requestor identifiers (IDs). The token service provider may provide data output related to token-based transactions to reporting tools and applications and present the token and/or the data substituted by the token (e.g., real account identifiers) as appropriate in the reporting output. An example of a token service provider is Visa Token Service. A token service provider can be operated by a transaction processing network, an issuer, or other entities.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Various embodiments will now be discussed in greater detail with reference to the accompanying figures, beginning with FIG. 1.

I. Example Computing Environment

FIG. 1 illustrates a simplified block diagram of an example computing environment 100 in accordance with certain embodiments of the invention. As shown, computing environment 100 includes a virtual device processing system 110 communicatively coupled to a mobile device 105 via a communication network 115. The embodiment depicted in FIG. 1 is merely an example and is not intended to unduly limit the claimed embodiments of the present invention. One of ordinary skill in the art would recognize many variations, alternatives, and modifications. For example, certain components of virtual device processing system 110 such as a dormancy determiner 105 can be part of mobile device 105 or can be running on one or more servers.

The various subsystems depicted in FIG. 1 may be implemented in software, in hardware, or in combinations thereof. In some embodiments, the software may be stored on a transitory or non-transitory computer-readable medium and/or be executed by one or more processors. It should be appreciated that system 110 may include other components than those depicted in FIG. 1. For example, system 110 may have more or fewer components than those shown in FIG. 1, may combine two or more components, or may have a different configuration or arrangement of components. In some embodiments, system 110 may be part of a number of servers.

Mobile device 105 may be of various different types, including, but not limited to a portable or handheld device such as a laptop, a mobile phone, a tablet, etc., and other types of devices. The mobile device 105 may comprise a mobile application 145 with a virtual access device 150. In some embodiments, mobile device 105 can enable a user to gain access to a location or obtain authorization for a payment transaction. The user can use virtual access device 150 on mobile device 105 at a point of sale (POS) to make purchases for goods or services. In some instances, the user may also use virtual access device 150 on mobile device 105 at an access point (e.g., a building entrance, a movie theatre entrance, a ticketing station, a subway turnstile, an electronic reader at a bus station, etc.) to gain access to a location.

Communication network 115 facilitates communications between one or more client devices such as mobile device 105 and virtual device processing system 110. Communication network 115 can be of various types and can include one or more communication networks or infrastructure. For example, communication network 115 can include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.11 suite of protocols, TCP/IP, IPX, SAN, AppleTalk, Bluetooth, and other protocols.

In certain embodiments, virtual device processing system 110 includes multiple subsystems including a dormancy determiner (also referred to as dormancy determination server) 120, a dormant device processor 125, a virtual device provisioner 130, a dormancy notifier 135, and an ad manager 140. One or more communication paths may be provided that enable the one or more subsystems to communicate with and exchange data with one another.

In some embodiments, dormancy determiner 120 can be part of a token service provider and can determine whether an access device such as a virtual payment card (e.g., a token) is dormant or not. Some embodiments may determine that an access device is dormant when the access device is not being used and has been in a dormant state. For instance, a physical access card (e.g., a bus pass, a subway card) may be determined to be dormant when there have been no transactions conducted using the access card for more than a threshold period of time (e.g., 30 days, 60 days, 90 days). In another instance, a virtual payment card (e.g., a credit/debit card) may be determined to be dormant when the user has not conducted any payment transactions using the virtual payment card, despite having used the physical payment card within a threshold period of time. In some instances, a virtual payment card may not have been used by a user for various reasons, such as the user having changed phones where the virtual payment card was provisioned on the previous phone and not on the new phone, the user having deleted the application that previously stored the virtual payment card, etc.

In some embodiments, dormancy determiner 120 may determine that the access device is dormant by accessing data storage (e.g., a database) that stores transaction data associated with the access device. Dormancy determiner 120 may determine that the access device is dormant if the last transaction was from before a threshold time interval or if there was never any transactions shown in the transaction data.

Different systems may define dormancy of an access device differently. There may be a set of dormancy rules that can be implemented to define the dormancy of an access device. In one instance, the dormancy rule may be that an access device is dormant if there have been no transaction conducted using the access device for more than 6 months. In another instance, a dormancy rule may specify that a virtual access device is dormant when a previous transaction occurred more than a threshold time period ago. In yet another instance, a dormancy rule may be that an access device is dormant if the user is no longer using the same mobile device onto which the access device was previously provisioned. Certain embodiments may obtain this type of information from an electronic wallet provider or a mobile device provider.

Some embodiments may determine that an access device is dormant when the access device satisfies multiple dormancy rules. The system administrators may select the dormancy rules to apply to the access devices in determining whether an access device is dormant. Some embodiments may have different set of dormancy rules that apply to different types of access devices (e.g., payment card versus building access card) when a determination is made as to whether an access device is dormant.

Some embodiments may determine that an access device is dormant when the credentials associated with the access device has not been used in a transaction within a certain period of time (e.g., 30 days, 60 days, 90 days). In certain embodiments, dormancy determiner 105 can access and monitor transaction data for a number of credentials and determine whether a particular set of credentials have been used in any type of transaction (e.g., purchasing goods or services, accessing a venue).

In some embodiments, dormancy determiner 120 can be implemented by one or more servers in a payment processing network. The one or more servers can access transaction history associated with a virtual payment card and one or more dormancy rules to make a determination as to whether the virtual payment card is dormant. In some embodiments, the one or more servers can determine that the virtual payment card is dormant upon determining that there has been inactivity by the virtual payment card for more than a year. Dormancy determiner 120 may also be implemented by one or more servers of an issuer bank, a transit network (e.g., for a subway system, for a bus system), an access network (e.g., for a building or any type of location) or any other entity that may provision or no longer provision a user's mobile device with a virtual access device.

In certain embodiments, a virtual device provisioner 130 can be configured to provision a computing device (e.g., a mobile device 105) with access data such as virtual access device 150. Provisioner 130 can be one or more provisioning server computers and can include a processor and a computer readable medium comprising code which causes the processor to perform any suitable method associated with provisioning the computing device with access data. Provisioner 130 may maintain a database of addresses (e.g., an IP or internet protocol address or phone number) for various mobile devices that can be provisioned with access data and also maintain a database of access data to be provisioned. The access data to be provisioned may have been previously obtained by an issuer operating an authorization computer system and/or a payment processor operating a validation entity computer.

By provisioning the computing device with the access device (i.e., provisioning the computing device with access data), the computing device can have a copy of credentials associated with the access device and can use the credentials to perform an access transaction. For instance, a mobile device that is provisioned with access data can allow a user to access an account to pay for a good or service at a merchant. In another instance, a mobile device that is provisioned with access data can be used to give the user access to a location such as a building. In this instance, the mobile device can interact with an access point device (not shown) and pass access data to the access point device. The access point device may locally verify the received access data or it may communicate with a remotely located authentication server computer (not shown). The remotely located authentication server computer may verify that the access data is authentic and may transmit a signal indicating this back to the access point device. The access point device may then proceed to let the user enter the building.

In some embodiments, provisioner 130 may be one or more servers of an issuer bank. In certain embodiments, provisioner 130 may be one or more servers of an entity that issues access devices, such as a transit operator, a building operator, a payment card issuer, etc. An example of provisioner 130 is provisioning server computer 270 described in FIG. 2. One of ordinary skill in the art would know that there are various methods in provisioning a set of credentials and/or any other identifying information (e.g., a device ID) associated with an access device onto a mobile device such as a smartphone.

In certain embodiments, dormant device processor 125 can determine how to process the access device upon receiving the information as to whether the virtual access device is dormant. Dormant device processor 125 can use the information on whether an access device is dormant and other types of information (e.g., whether the mobile device onto which the access device was provisioned is no longer being used by the user) to make a determination as to what to do with the virtual access device. In some embodiments, upon determining that a virtual payment card is dormant, dormant device processor 125 can determine not to renew the virtual payment card and not to re-provision a renewed virtual payment card onto a mobile device. In certain embodiments, dormant device processor 125 may determine to close an old virtual payment card and email the customer a notification. In some embodiments, dormant device processor 125 can instruct notifier 135 to send a notification to the subscriber of the virtual payment card to notify the subscriber that the virtual payment card will be closed due to inactivity.

In some embodiments, dormant device processor 125 can be one or more servers that are part of an access device network (e.g., a payment processing network) or an access device issuer (e.g., an issuer bank). Dormant device processor 125 can receive information from other entities such as an electronic wallet provider or mobile device provider and determine whether the user has been using other payment devices also provisioned and stored on the same mobile device. Upon determining that the user has been using other payment devices via the mobile device, dormant device processor 125 may determine to re-provision an updated or renewed version of the dormant virtual card. In certain embodiments, dormant device processor 125 may determine not to re-provision the dormant virtual card upon determining that the user has not used the virtual card beyond a threshold period of time while the user has continued to use the other virtual cards.

In some embodiments, dormancy notifier 135 can send out one or more notifications to an access device holder. In some embodiments, dormant device processor 125 may determine to close an account associated with a virtual access device e.g., upon determining that the virtual access device is dormant. Dormant device processor 125 may request dormancy notifier 135 to send out a notification to the dormant device holder informing the device holder closure of the account. In some embodiments, notifier 135 can send a card owner a message indicating that the card will be closed within a certain number of days. In certain embodiments, notifier 135 can also send a message to the owner requesting confirmation of card renewal. In some embodiments, notifier 135 can be part of one or more servers of an access device issuer, such as a payment card issuer bank.

In certain embodiments, ad manager 140 can send one or more advertisements to a mobile device to incentivize the user to use a virtual access device. In some embodiments, upon determining that a virtual access device is dormant, dormant device processor 125 may cause ad manager 140 to select or generate an ad that gives the user a benefit (e.g., a percentage of cash back, a free gift card, a discount or coupon for one or more merchants) in exchange for the user using the virtual access device. Some embodiments may provide tailored ads to a user based on the user's preferences, historical activities, etc. in determining an effective ad to encourage the user to use the virtual access device.

Further, ad manager 140 in some embodiments can send incentives to a mobile device to encourage the user to request renewal of a virtual payment device. Ad manager 140 can also provide promotional offers and other incentives to the consumer during such engagements to promote usage. As such, consumer engagement with the issuer may be increased.

Systems depicted in some of the figures may be provided in various configurations. In some embodiments, the systems may be configured as a distributed system where one or more components of the system are distributed across one or more networks in one or more cloud infrastructure systems.

II. Example System

Figure 2:
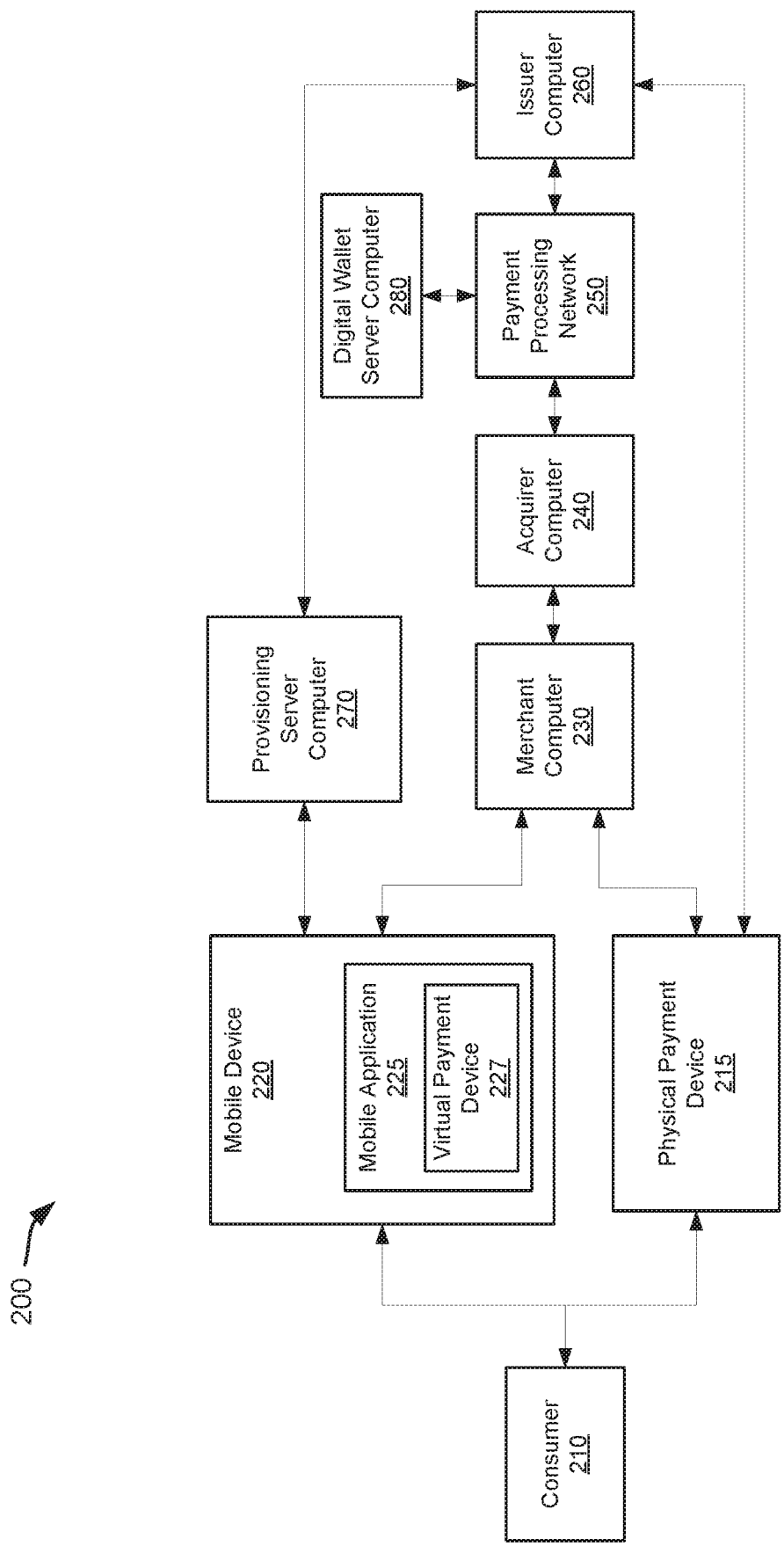
FIG. 2 shows an example system involving a virtual payment card that may be dormant in accordance with certain embodiments of the invention.

FIG. 2 shows an example system 200 involving a virtual payment card that may be dormant in accordance with certain embodiments of the invention. System 200 comprises a mobile device 220 and a physical payment device 215 which both may be associated with a consumer 210. The mobile device 220 may comprise a mobile application 225 with a virtual payment device 227. The consumer 210 may be able to use the physical payment device 215 and/or the virtual payment device 227 for purchases at a merchant. The system 200 may further comprise a merchant computer 230, an acquirer computer 240, a payment processing network (also referred to as transaction processing network or transaction processing computer(s)) 250, and an issuer computer (also referred to as authorization computer) 260, all of which may all be in direct or indirect communication with one another. The system 200 may also comprise a provisioning server computer 270, which may be in communication with the mobile device 220, the issuer computer 260, and any other suitable entity. The system 200 may also include a digital wallet server computer 280.

The physical payment device 215 may store payment credentials associated with the consumer 210. For example, the physical payment device 215 may store a PAN (primary account number) or a token, as well as personal information such as a name, address, email address, phone number, or any other suitable consumer 210 identification information. The physical payment device 215 may provide the payment credentials to the merchant computer 230 or a merchant access device during a transaction (e.g., via magnetic stripe, NFC, etc.).

The virtual payment device 227 may also include payment credentials associated with the consumer 210. For example, the virtual payment device 227 may include a PAN or a token, as well as personal information such as a name, address, email address, phone number, or any other suitable consumer 210 identification information. The virtual payment device 227 may be associated with the physical payment device 215. For example, the virtual payment device 227 may include the same PAN as the physical payment device 215, or the virtual payment device 227 may include a token based on the PAN of the physical payment device 215.

The mobile device 220 may be able to provide the payment credentials of the virtual payment device 227 to the merchant computer 230 or a merchant access device during a transaction (e.g., via NFC or other short range communication). For example, the mobile device 220 may execute the mobile application 225, and the mobile application 225 may utilize communication capabilities of the mobile device 220 for providing the payment credentials.

The merchant (which may operate the merchant computer 230) may engage in transactions, sell goods or services, or provide access to goods or services to the consumer 210.

The acquirer computer 240 may be associated with the merchant computer 230, and may manage authorization requests on behalf of merchant 230. The acquirer 240 may forward an authorization request from the merchant 230 to the payment processing network 250.

The payment processing network 250 may be disposed between the acquirer computer 240 and the issuer computer 260. The payment processing network 250 may include data processing subsystems, networks, and operations used to support and deliver authorization services, exception file services, and clearing and settlement services. For example, the payment processing network 250 may comprise a server computer, coupled to a network interface (e.g. by an external communication interface), and a database(s) of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 250 may use any suitable wired or wireless network, including the Internet.

The payment processing network 250 may also be able to analyze the usage of a given payment device. For example, the payment processing network 250 may be able to determine whether a given virtual payment device is dormant or being actively used. In some embodiments, payment processing network 250 may make the dormancy determination by accessing and monitoring payment transactions performed by a given payment device.

Certain embodiments may determine that a given virtual payment device is dormant when payment processing network 250 does not observe any transactions performed by the virtual payment device within a threshold time interval (e.g., 60 days, a year, 2 years, 5 years). Some embodiments may determine that the virtual payment device when there have not been any activity associated with the virtual payment device. For instance, the virtual payment device may be determined to be dormant if the user has not accessed the virtual payment device's online profile to view the account for more than a threshold period of time.

In some embodiments, payment processing network 250 may be able to obtain additional data related to a mobile device onto which a given virtual payment device is provisioned. For instance, payment processing network 250 may determine whether the mobile device is still operational and being used by the same user by sending a request to the mobile device providers, cellular network service providers, internet service providers, etc. In another instance, payment processing network 250 may determine whether the mobile application where the virtual payment device is saved is still operational and being used by the same user. Some embodiments may send a request to an electronic wallet provider to determine whether the user is using one or more other virtual payment cards. Certain embodiments may receive an indication that other virtual payment cards are still being used by the user. In some such embodiments, payment processing network 250 (or issuer computer 260) may still determine that the virtual payment device should be renewed, despite the dormancy of the given virtual payment device.

The issuer computer 260 may issue a payment account and an associated payment device 215 (e.g., a physical plastic payment card, a payment tag) to the consumer 210. The issuer computer 260 may also issue a virtual payment device 227 for the consumer's mobile device 220. The issuer computer 260 may renew the payment device 215 and/or the virtual payment device 227 when appropriate. The issuer computer 260 may also process authorization requests received from the merchant 230.

In some embodiments, the issuer computer 260 may not be able to determine whether the virtual payment device 227 is being utilized. For example, incoming authorization request messages may contain the same payment credential information, regardless of whether the physical payment device 215 or virtual payment device 227 was used for the transaction. Some embodiments may determine that the virtual payment device 227 is being used in a payment transaction instead of the physical payment device 215 by requesting transaction information from payment processing network 250.

In some embodiments, transactions conducted by a virtual payment device 227 can be differentiated by transaction conducted by a physical payment device 215 via a variety of methods. For instance, payment processing network 250 may notate the transactions conducted by a virtual payment device differently compared to transactions conducted by a physical payment device (e.g., by marking next to each transaction whether the transaction was made by the virtual payment device). Further, the virtual payment device may have a different PAN, CVV, or other types of identifiers (e.g., identification numbers) that can differentiate its payment transactions against those transactions made by the counterpart physical payment device.

The provisioning computer 270 may be able to provision the virtual payment device 227 to the mobile device 220. The provisioning computer 270 may be associated with the issuer computer 260, the payment processing computer 250, or any other suitable entity. In some embodiments, upon determining that virtual payment device 227 is dormant (and in some instances, that mobile device 220 is also dormant), issuer computer 260 (or payment processing computer 250) may determine not to renew the virtual payment device 227. As such, provisioning computer 270 need not re-provision an updated or renewed virtual payment device to the mobile device 220. This can minimize any failed provisioning attempts and potential re-provisioning loops that could cause an overload on the processing bandwidth.

As described, in some embodiments, issuer may determine to not renew certain virtual payment cards upon determining that the virtual payment card and/or the mobile device are dormant. Upon determining that the virtual payment card is not dormant, the issuer may proceed to provision a renewed virtual payment card onto the user's mobile device. Some embodiments may make the determination as to whether to cancel the auto-renewal of a virtual payment card by requesting additional data from digital wallet server computer 280.

The digital wallet server computer 280 may be configured to maintain a digital wallet associated with the user of the mobile device 220 as well as other users. A "digital wallet" can store user profile information, payment information (e.g. PANs or primary account numbers, payment tokens (i.e., PAN substitutes), verification values such as CVVs, etc.), bank account information, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

In some embodiments, transaction processing network 250 or authorization computer 260 may send a request to digital wallet server computer 280 to determine whether a user's various other access devices (e.g., credit/debit card, transit pass) are dormant. Transaction processing computer(s) 250 and/or authorization computer 260 may then make a determination as to whether to renew a virtual access device based on the received response, in addition to the dormancy of the virtual access device.

In some embodiments, instead of inquiring the payment processing network regarding the dormancy of a particular virtual access device, embodiments may simply send a request to digital wallet server computer 280 to determine whether a particular virtual access device (or in some instances other virtual access devices and/or a mobile application being provided by digital wallet server computer 280) has activity. Upon determining that the user has performed one or more transactions using the particular virtual access device (or one or more of the other virtual access devices and/or the mobile application), an issuer computer 260 may determine to renew the particular virtual access device.

Some embodiments may mark the virtual access device as do not renew upon receiving a response from digital wallet server computer 280 that the particular virtual access device has not been active (e.g., user has not performed any transactions using the virtual access device, user has not interacted with the virtual access device by adding credit to it or by changing a profile associated with the virtual access device). Certain embodiments may determine to cease to renew the particular virtual access device upon determining that not only is the particular virtual access device inactive, but there has also not been any user activity associated with the mobile application provided by the digital wallet service (e.g., user has not interacted with other virtual access devices accessible via the mobile application, user has not interacted with a user profile created using the mobile application).

Each of the entities in FIG. 2 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

III. Example Life Cycle of an Access Device

Access device such as payment cards have expiration dates to help protect against fraud. The expiration dates allow merchants and issuers to validate that a card is open and valid (e.g., through real-time authorization). That is, expiration dates may serve as an additional mechanism than the card number for authorizing a transaction. It is important for these access devices to be renewed every so often so that the expiration dates may be updated.

Figure 3:
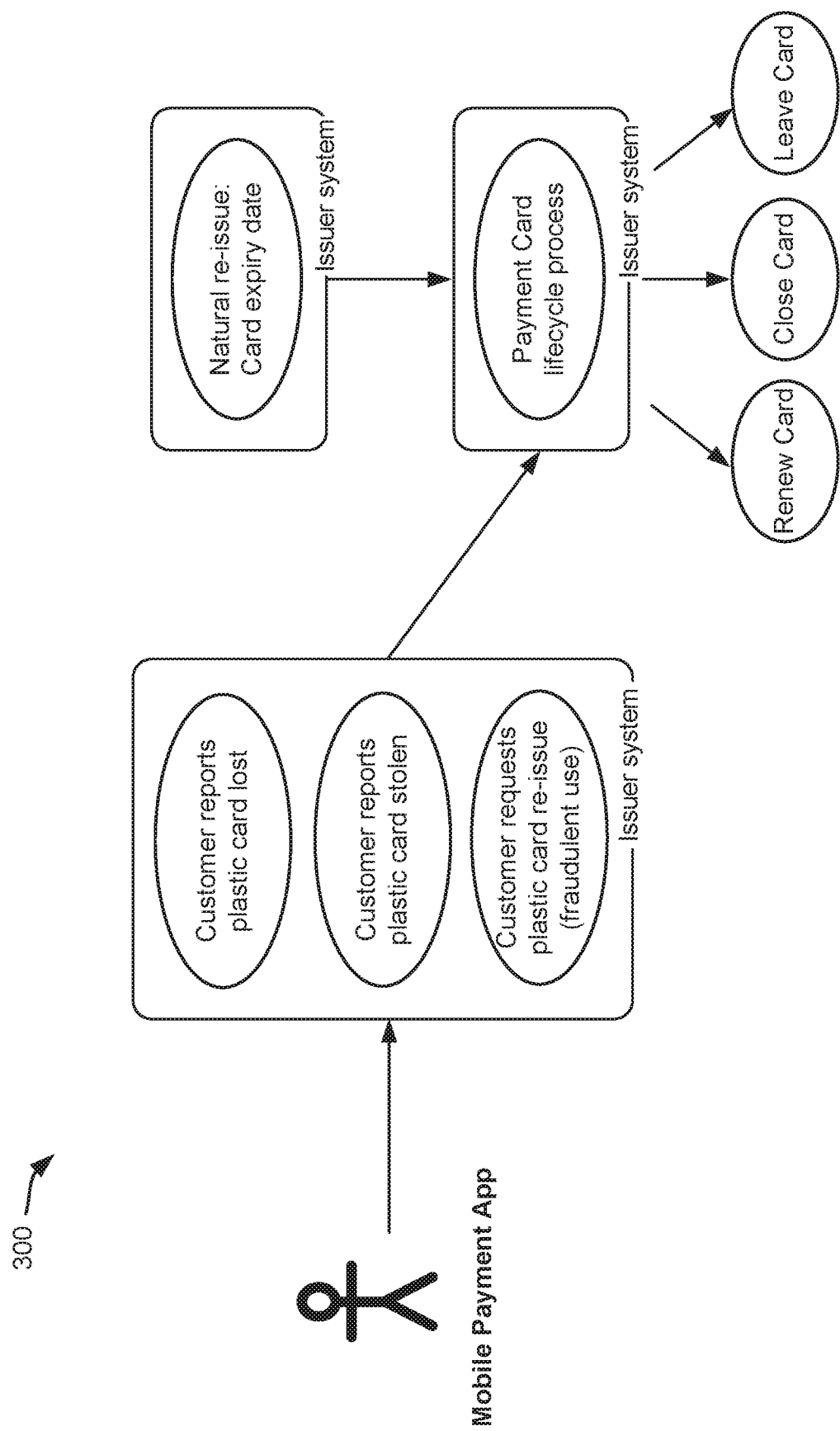
FIG. 3 shows an example payment device lifecycle, according to embodiments of the invention.

FIG. 3 shows an example payment device lifecycle 300 according to embodiments of the invention. Typically, a physical payment device will have an expiration date. When the physical payment device expires, an issuer computer may automatically renew (or reissue) a new physical payment device, optionally with the same payment credentials or new payment credentials. This is one example of a natural renewal or reissue process.

There are also forced renewal processes, where the physical payment device may be renewed before the expiration date. For example, as shown in FIG. 3, the consumer may report that the physical payment device was lost or stolen, or the consumer may report that a physical payment device was fraudulently used. A consumer can report these events by telephone, via a mobile application (e.g., that uses a token service provider such as Visa Token Services), or via any other suitable means of communication. In these situations, the issuer computer may immediately renew the physical payment device (e.g., by mailing a new physical payment device to the consumer), and the new physical payment device may have new payment credentials.

In some instances, the issuer computer may not renew the physical payment device. Instead, as shown in FIG. 3, the issuer computer may close the physical payment device and/or associated payment account, or the issuer computer may leave the physical payment device in its current state.

These payment device lifecycle events can also apply to virtual payment devices. For example, a virtual payment device may be associated with a physical payment device, and it may be necessary to renew the virtual payment device when the physical payment device is being renewed (e.g., the original virtual payment device may become inoperative when the physical payment device is renewed). However, it may be inefficient to automatically renew a virtual payment device whenever the corresponding physical payment device is renewed, as the consumer may have switched to a different mobile device, deleted or stopped using the mobile application, or otherwise stopped using the virtual payment device. The following description provides a process for determining whether to renew a virtual payment device based on dormancy, consumer preference, and any other suitable information, such that virtual payment devices can be selectively renewed.

IV. Example Process for Renewing and Re-provisioning a Virtual Access Device

Figure 4:
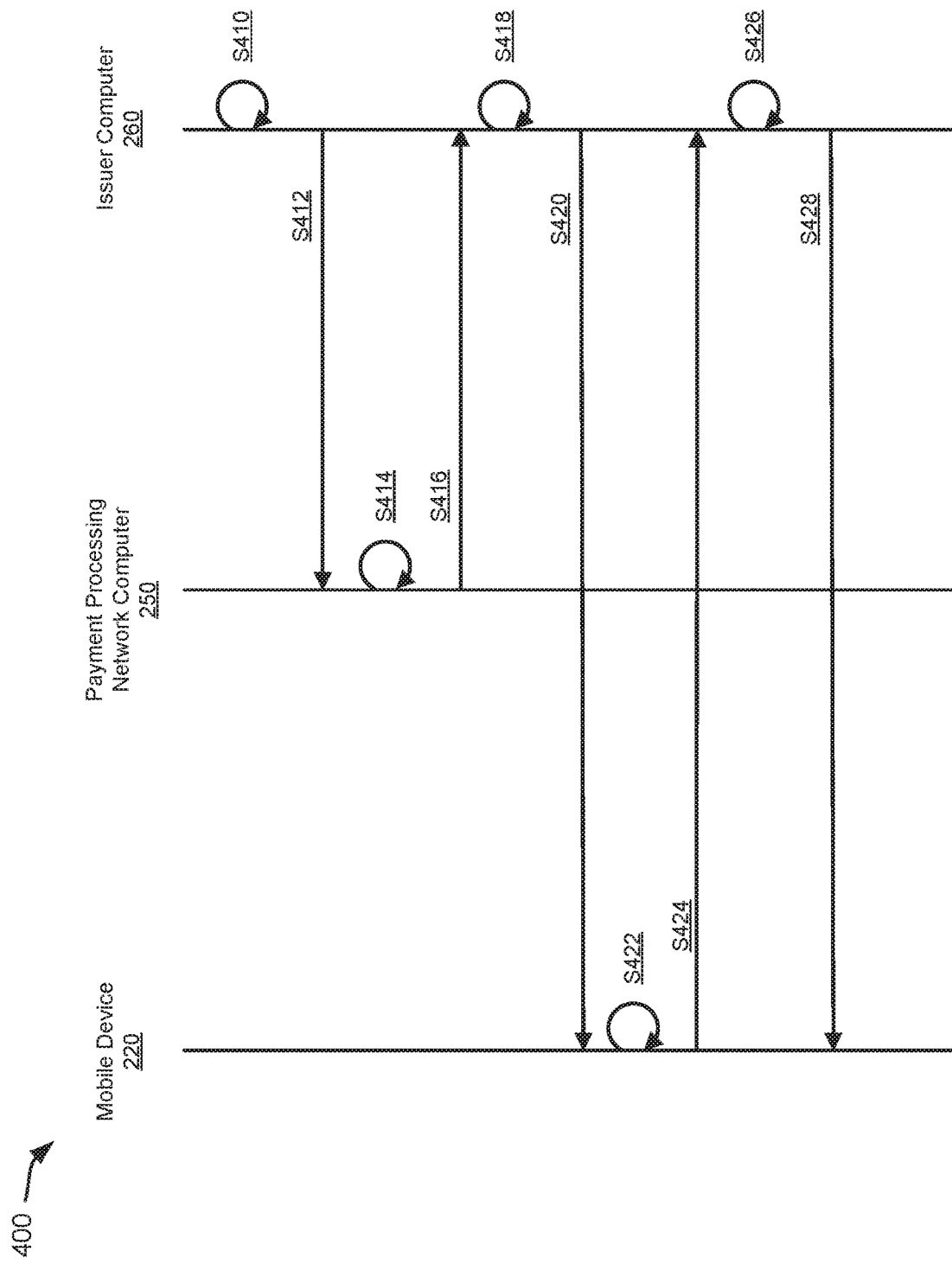
FIG. 4 illustrates an example process flow for renewing a virtual access device in accordance with certain embodiments of the invention.

FIG. 4 illustrates an example process flow 400 for renewing a virtual access device in accordance with certain embodiments of the invention. In some embodiments, an issuer computer (e.g., issuer computer 260) may renew a physical access device such as physical payment device 215. In certain embodiments, renewing the physical payment device 215 may trigger the issuer computer 260 to evaluate the best way to proceed with respect to the virtual payment device 227 provisioned on mobile device 220.

At step S410, the issuer computer 260 may renew the physical payment device 215, and the issuer computer 260 may identify an associated virtual payment device 227. In some embodiments, a physical payment device is not required. Some embodiments may only have virtual access devices provisioned on a mobile device. As such, a trigger to determine whether the virtual access device need to be renewed can be an expiration date associated with the virtual access device. In some embodiments, the trigger may be a renewal date that occurs periodically (e.g., every year since the opening date of the virtual access device, every other year, every 5 years, etc.).

At step S412, the issuer computer 260 may send an activity request message to the payment processing network 250. The request may include information about the virtual payment device 227, the consumer 210, the mobile device 220, and any other suitable information. In some embodiments, the information about the virtual payment device 227 can include a PAN, a CVV, a pin number, an expiration date, any other type of identifier, or a combination of the above.

At step S414, the payment processing network 250 may determine whether the virtual payment device 227 is being actively utilized or whether the virtual payment device 227 is dormant. The payment processing network 250 may be able to identify previous transactions that involved the virtual payment device 227. The payment processing network 250 may determine how recently the virtual payment device 227 was used and how frequently the virtual payment device 227 is used.

In some embodiments, the payment processing network 250 may determine whether the virtual payment device 227 is dormant or active based on a number of factors. For example, the virtual payment device 227 may be considered dormant if the virtual payment device 227 has not been used within the last week, month, ninety days, six months, a year, or any other suitable amount of time. In another example, the virtual payment device 227 may be considered dormant if it is used less than any suitable frequency, such as once a month. The date on which the virtual payment device 227 was initially added, and the most recent date when the virtual payment device 227 was serviced (e.g., renewed) can also be considered when determining dormancy. One of ordinary skill in the art would recognize that dormancy can be identified in a number of other ways. Rules for determining dormancy can be set by the payment processing network 250, issuer computer 260, or any other suitable entity.

At step S416, the payment processing network 250 may send an activity response message back to the issuer computer 260, the message indicating whether the virtual payment device 227 is active or dormant. In some embodiments, the response message may also include information such as how long the virtual payment device 227 has been dormant, details on one or more of the most recent activities and their dates, locations, associated merchants, and transaction amounts, etc.

In some embodiments, instead of responding to issuer computer 260 queries, the payment processing network 250 may send batch updates for all virtual payment devices. In other embodiments, the issuer computer 260 may be able to determine whether the virtual payment device 227 is active or dormant without querying other entities such as the payment processing network 250.

At step S418, the issuer computer 260 may determine how to proceed based on whether the virtual payment device 227 is active or dormant. For example, if the virtual payment device 227 is dormant, the issuer computer 260 may send a request to the mobile device 220, asking the consumer 210 whether renewal of the virtual payment device 227 is desired.

Several other actions can be taken by the issuer computer 260 at this point. For example, in some embodiments, if the virtual payment device 227 is dormant, the issuer computer 260 may automatically close the virtual payment device 227 without consulting the consumer 210. In some embodiments, the issuer computer 260 may close the virtual payment device 227 and send a notification message to the consumer 210 notifying the consumer 210 that the virtual payment device 227 (or an account associated with the virtual payment device 227) has been closed and is no longer accessible.

Also, in some embodiments, if the virtual payment device 227 is active, the issuer computer 260 may automatically renew the virtual payment device 227 (e.g., by provisioning an updated virtual payment device 227). Alternatively, the issuer computer 260 may close the current virtual payment device 227 and query the consumer 210 about renewing a new virtual payment device 227 regardless of whether the virtual payment device 227 is active or dormant (e.g., in order to be certain whether the consumer 210 still wants to use the virtual payment device 227, and/or to drive consumer engagement).

Further, in some embodiments, the issuer computer 260 may determine how to proceed further based on whether the mobile device 220 and/or the mobile application 225 are dormant or active. For example, if the mobile device 220 and/or the mobile application 225 are dormant and the virtual payment device 227 is dormant, then the issuer computer 260 may not renew the virtual payment device 227 and may not re-provision the updated virtual payment device onto mobile application 225 stored on mobile device 220.

However, in some embodiments, if the mobile device 220 and/or the mobile application 225 are not dormant but active (e.g., the consumer 210 may be using other mobile applications or may be using other access devices stored on the mobile application 225) then issuer computer 260 may determine to renew the virtual payment device 227 and re-provision the updated virtual payment device onto mobile application 225 (e.g., without requesting input from the user).

At step S420, the issuer computer 260 may send a renewal request message to the consumer 210, upon determining that the virtual payment device 227 is to be renewed. As described, in some embodiments, the determination may be made upon determining that the virtual payment device 227 is dormant. In certain embodiments, the determination to renew may be made upon determining that the virtual payment device 277, the mobile application 225 servicing the virtual payment device 277, and/or the mobile device 220 are dormant. The renewal request message may be sent via email, SMS, mobile application 225 notification, or any other suitable form of communication. The request may be sent to a consumer 210 contact address associated with the virtual payment device 227. The renewal request may ask the consumer 210 whether or not the virtual payment device 227 should be renewed. In some embodiments, the renewal request message may include a promotional offer or other incentive for the consumer 210 to have the virtual payment device 227 renewed and to encourage usage.

At step S422, the consumer 210 may indicate whether or not the virtual payment device 227 should be renewed. For example, the consumer 210 may respond to an email or SMS, or the consumer 210 may select an option in the mobile application 225. The consumer 210 may also be able to provide updated contact information (e.g., in case the consumer 210 is now using a different mobile device 220).

At step S424, the mobile application 220 (or other consumer device associated with the consumer 210) may send a renewal response message back to the issuer computer 260 (e.g., via email, SMS, mobile application 125, etc.). Some embodiments may not send a renewal request message to the consumer 210 and automatically renews the virtual payment device 227 without receiving a renewal response message.

At step S426, the issuer computer 260 may determine whether to renew, close, leave, or send an alternative instruction regarding the virtual payment device 227. The issuer computer 260 may determine whether to renew based on the consumer's response, the activity/dormancy of the virtual payment device 227, the activity/dormancy of mobile device 225, the activity/dormancy of mobile application 220, potential fraud associated with the virtual payment device 227, and/or any other suitable factor. For example, if the consumer 210 indicated that the virtual payment device 227 should be renewed, the issuer computer 260 may proceed to renew the virtual payment device 227.

In some embodiments, if the consumer 210 does not respond to the renewal request, the issuer computer 260 may determine that the virtual payment device 227 will be closed and will not be renewed. For example, the consumer 210 may not have responded because the consumer 210 is no longer using the mobile device 220, has deleted or stopped using the mobile application 225, or is no longer interested in using the virtual payment device 227. In these cases, renewing the virtual payment device 227 may not provide any benefit.

Furthermore, renewing the virtual payment device 277 and re-provisioning the mobile device 220 or mobile application 225 when the consumer 210 is no longer using the mobile device 220 or the mobile application 225 may cause multiple failed re-provisioning attempts. As the issuer computer 260 repeatedly attempts to provision and re-provision the virtual payment device onto the mobile device 220, the systematic retry process may cause the issuer's system to crash due to peak load during which too many renewal requests failed. Identifying these virtual payment devices that need not be renewed and re-provisioned enable the stopping of the creation of unnecessary issuer support tickets, increasing over-the-air provisioning success rates, and minimizing loads on the payment processing network (e.g., VTS) and issuer infrastructure.

In some embodiments, the issuer computer 260 may not query the consumer 210, and may decide whether to issue based solely on the activity/dormancy of the virtual payment device 227.

At step S428, the issuer computer 260 may proceed to renew the virtual payment device 227 and/or the mobile application 225. In some embodiments, the issuer computer 260 may instruct the payment processing network 250 or the provisioning computer 270 (that may be part of the issuer) to provision the virtual payment device 227 to the mobile device 220. The same payment credentials may be provided, or the old payment credentials may be replaced with new payment credentials (e.g., a new PAN or payment token). The renewed virtual payment device may also have a new expiration date and/or other identifiers that may distinguish it from the previously existing virtual payment device 227.

In some embodiments, the payment processing network 250 may orchestrate provisioning instead of the issuer computer 260, and the payment processing network 250 may perform one or more of the above steps instead of the issuer computer 260.

V. Example Flow for Determining Whether to Renew a Virtual Access Device

Embodiments may determine whether to renew a virtual access device such as a virtual payment device, based on one or more factors including dormancy. Certain embodiments may determine that a virtual payment device need not be renewed when it has been determined that the virtual payment device or a mobile device to which the virtual payment device is provisioned is dormant.

Figure 5:
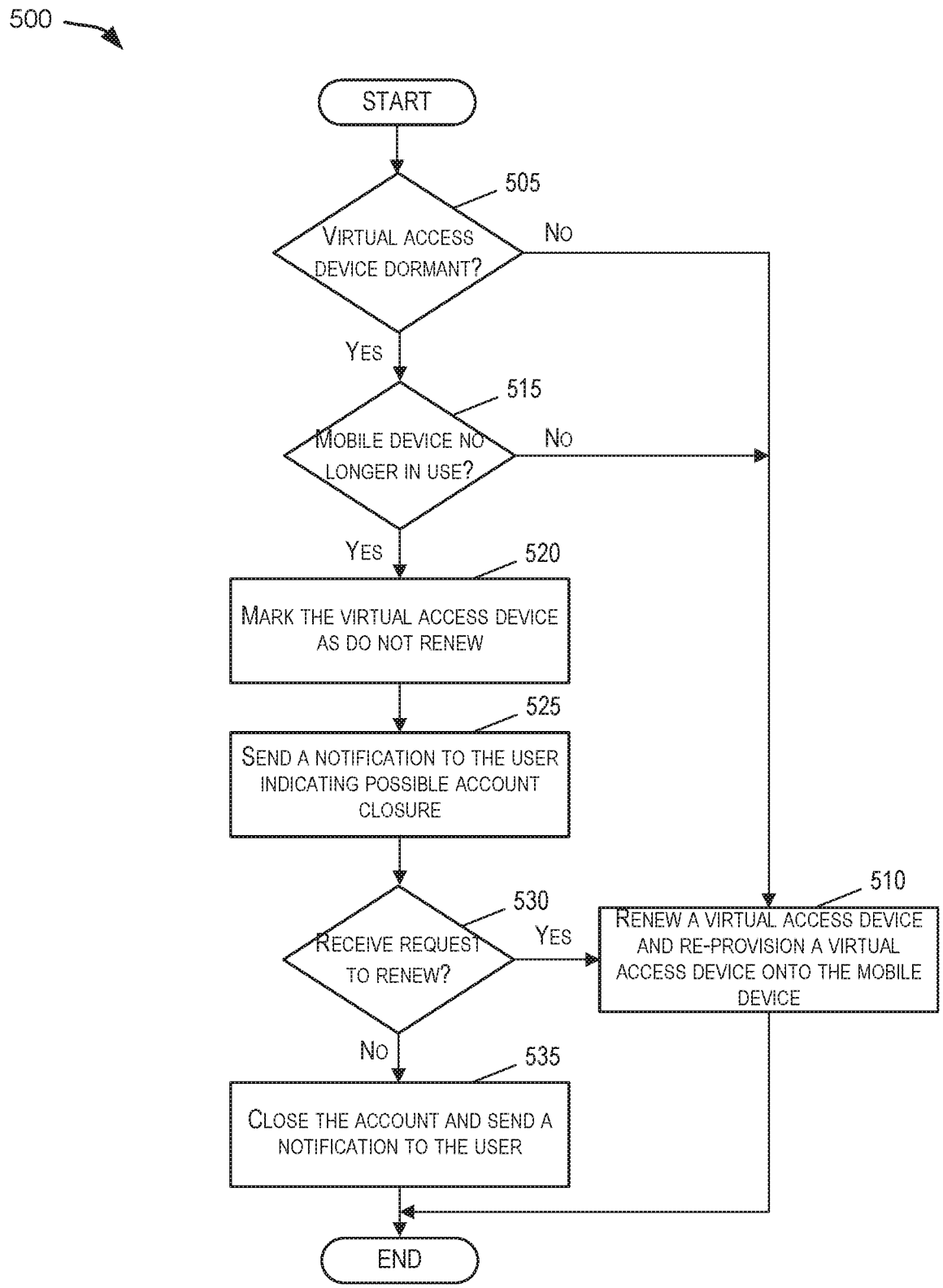
FIG. 5 shows a flow chart for determining whether to renew a virtual access device and re-provision a user's mobile device in accordance with some embodiments of the invention.

FIG. 5 shows a flow chart 500 for determining whether to renew a virtual access device and re-provision a user's mobile device in accordance with some embodiments of the invention. Some embodiments may auto-renew a virtual access device upon certain trigger events, such as upon its expiration date, upon the renewal of its counterpart physical access device, when the credentials, the counterpart physical access device, or a consumer device (e.g., the user's mobile device) has been reported stolen or lost, or when the customer requests a re-issue due to potential fraudulent uses, etc. Certain embodiments may auto-renew a virtual access device at the same time or within a timeframe that a counterpart physical access device is being renewed. As it may be inefficient and ineffective to auto-renew all virtual access devices while some virtual access devices may be dormant, some embodiments may determine whether to renew based on a number of factors including a dormancy of the virtual access device.

The process illustrated by flow chart 500 can be performed by one or more processors on one or more servers (such as an authorization server) that are part of an access device issuer such as a payment card issuer, a transit pass issuer, etc. In some embodiments, a portion of the process described by flow chart 500 may also be performed by a transaction processing network, such as a payment processing network.

Some embodiments may not renew a virtual access device although the physical access device is being renewed. In some instances, although the physical access device is still being used by a user on a regular basis, the virtual access device may be dormant (e.g., being used at a low rate or below a threshold frequency). As such, embodiments may determine that it would not be productive to renew the virtual access device and re-provision the user's device with the new virtual access device. Certain embodiments may perform a determination as to whether to renew the virtual access device based on a number of factors in addition to the dormancy of the device. For example, some embodiments may renew the virtual access device upon determining that other virtual access devices (e.g., other virtual payment cards) provisioned on the user's device are still being used by the user. In some such embodiments, the user's mobile device is still being used by the user (i.e., the user has not changed devices) and the mobile application hosting the virtual payment cards has not been deleted by the user.

At block 505, a determination is made as to whether a virtual access device is dormant. Some embodiments may trigger the determination to be made upon determining that an expiration date is coming up (e.g., within a threshold number of days or weeks from the expiration date), that a physical counterpart has been or is being renewed, if there has been potential fraud reported, if a mobile device onto which the virtual access device was initially provisioned has been reported lost or stolen, etc. The determination in some embodiments may be made by a transaction processing network such as a payment processing network or an access device issuer such as a virtual card issuer.

Some embodiments may make the determination that a virtual access device may be dormant by sending a request to a transaction processing network (e.g., a payment processing network, a transit system, a ticket processing network). In some embodiments, a virtual access device may be determined to be dormant when there have not been transactions conducted using the virtual access device (e.g., its payment credentials) for beyond a threshold period of time. Certain embodiments may determine that a virtual access device is dormant when the frequency of transaction is below a threshold number. The transaction processing network may access a database to determine past instances of transactions conducted using the virtual access device, the date and time of the transactions, and the frequency of transactions, etc. Different embodiments may make the determination as to whether a virtual access device is dormant differently.

At block 510, upon determining that the virtual access device is not dormant, the virtual access device may be renewed. Some embodiments may provision the updated virtual access device onto the mobile device. In some embodiments, prior to provisioning the updated virtual access device onto the mobile device, a confirmation may be sent to the user to confirm that the user would like the updated virtual access device to be re-provisioned onto the same mobile device. Some embodiments allow the user to input additional mobile devices (e.g., a mobile tablet, a mobile computer) that the user would like the renewed virtual access device provisioned. Certain embodiments enable the user to input another device that the user would like the renewed virtual access device provisioned instead. Upon receiving a confirmation as to the devices that the user would like the renewed virtual access device provisioned, an issuer server may provision the renewed virtual access device onto those one or more devices.

While some embodiments may determine not to renew the virtual access device based just on the dormancy of the virtual access device, certain embodiments may make the determination based on a number of factors, e.g., dormancy of the mobile application or mobile device onto which the virtual access device is provisioned. At block 515, upon determining that the virtual access device is dormant, a determination can be made as to whether the mobile device (e.g., mobile device 220 from FIG. 2) is no longer in use.

In some embodiments, the determination can be made by sending a request to one or more electronic wallet service providers (e.g., Apple Pay®, Google Wallet®, etc.) or mobile device providers (e.g., Google, Samsung, Apple, etc.) in some instances. The request may be for transaction history associated with a user's mobile application (e.g., mobile application 225 from FIG. 2) that hosts multiple access devices. The one or more electronic wallet providers may host a payment service via a mobile application. In some embodiments, the mobile device may be determined to still be in use (i.e., not dormant) if the user is using the mobile application to conduct transactions using one or more access devices, regardless of whether the one or more access devices includes the virtual access device at issue. In certain embodiments, the mobile device may be determined to still be in use if the user is interacting with the mobile application. For example, if the user is checking a balance or transaction history associated with any of the access devices hosted by the mobile application.

In some embodiments, the mobile device may be determined to still be in use (i.e., not dormant) if the user is still using the same mobile device previously subscribed for the virtual access device. Some embodiments may determine that the user is still using the same mobile device by sending a request to a cellular network service provider or internet service provider. Various methods may be used in making the determination. Upon determining that the mobile device (and/or mobile application) is still in use and not no longer being used by the user at block 515, the virtual access device may be renewed at block 510. Some embodiments may renew the virtual access device and re-provision the updated virtual access device onto the mobile device. Certain embodiments may also determine not to renew the particular virtual access device although other virtual access devices are still being used.

At block 520, upon determining that the mobile device (and/or mobile application) is no longer in use at block 515, the virtual access device may be marked as do not renew. Some embodiments may notate the virtual access device as one to skip auto-renewal e.g., in a database. The access device issuer or the authorization server may then automatically renew various virtual access devices other than those notated as do not renew. By identifying those virtual access devices that need not be renewed, the authorization server need not request a new token for those virtual access devices to be provisioned onto the users' mobile devices. This in turn can reduce the processing load on the authorization server and the token service provider.

At block 525, a notification indicating possible account closure can be sent to the user. Some embodiments may send an e-mail message to an e-mail account, a letter to a physical address, a text message, or other types of messages to the user informing the user that the virtual access device may be closed and therefore no longer usable in a transaction. Instead of a notification of closure, some embodiments may inquire whether the user does intend to close the virtual access device or if the user instead would like to have the access device renewed.

At block 530, a determination can be made as to whether a request to renew has been received. In some embodiments, upon receiving the notification of potential closure of the virtual access device, the user may send a request to renew the virtual access device.

At block 535, upon determining that the request to renew has not been received, the account can be closed and a notification of the account closure can be sent to the user. Upon determining that the request to renew has been received, at block 510, the virtual access device can be renewed. Some embodiments may wait for a response from the user as to whether the user would like to renew the virtual access device. If a response or a request to renew has not been receive for more than a threshold period of time, then an issuer may close the virtual access device.

VI. Example Flow for Determining a Dormancy of a Virtual Access Device

Various embodiments determine the dormancy of a virtual access device in making the determination as to whether to renew the virtual access device. Some embodiments determine the dormancy of one or more virtual access devices periodically and without being prompted by any trigger. This serves as a cleaning mechanism that eliminates unnecessary renewals ahead of time. Certain embodiments determine the dormancy of the virtual access device when an expiration date of the virtual access device is approaching. In some embodiments, the dormancy of a virtual access device can be determined by one or more servers at an issuer or one or more servers that are part of a transaction processing network (e.g., payment processing network).

Figure 6:
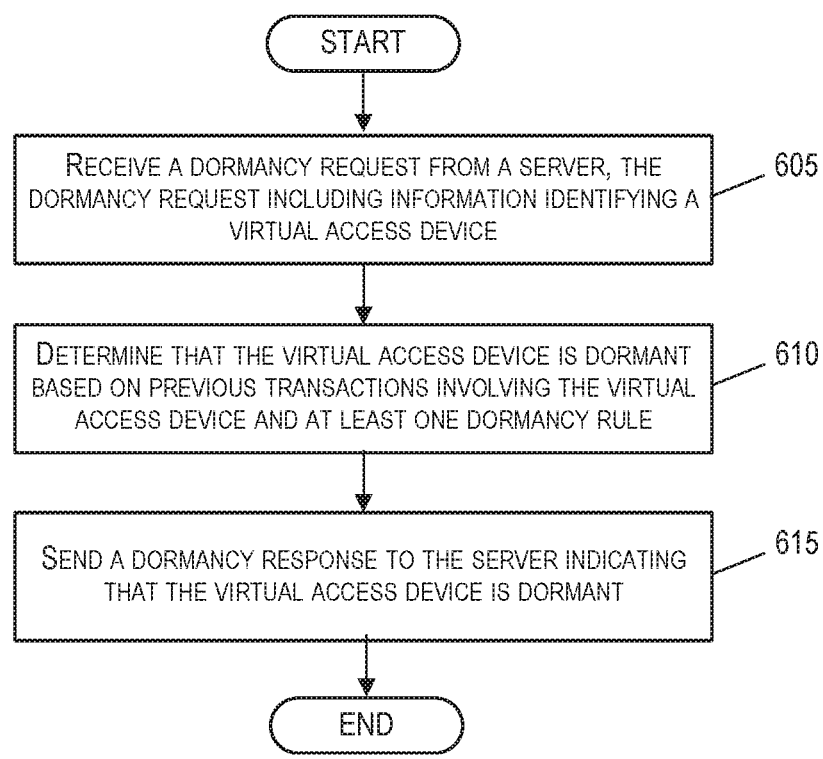
FIG. 6 shows a flow chart for determining whether a virtual access device is dormant in accordance with certain embodiments of the invention.

FIG. 6 shows a flow chart 600 for determining whether a virtual access device is dormant in accordance with certain embodiments of the invention. In some embodiments, a virtual access device is dormant if there has been an activity level below a certain threshold. Some embodiments may send a dormancy response to a dormancy status requestor in response to a request for a virtual access device's dormancy status. The process illustrated by flow chart 600 can be performed by one or more processors on one or more servers that are part of a transaction processing network such as a transit network or a payment processing network. A transaction processing network may process payment transactions or other types of access transactions.

At block 605, a dormancy request from a server can be received, where the dormancy request includes information identifying a virtual access device. In some embodiments, the information identifying a virtual access device can include user profile information, payment information (e.g. PANs or primary account numbers, payment tokens (i.e., PAN substitutes), verification values such as CVVs, etc.), bank account information, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like PAN, a device ID associated with the virtual access device, or a combination of identifiers. For instance, information identifying a virtual access device such as a payment card can include a PAN, expiration date, security code, a token, or a combination of the above. In another instance, information identifying a virtual access device such as an access card can include a serial code, identification numbers, etc. In certain embodiments, the information identifying a virtual access device can be used to identify a particular user account and/or access device among a list of other identifiers. For instance, the PAN of a virtual payment card can be used to search a database of transactions to determine whether the virtual payment card has been used and how often.

At block 610, the virtual access device can be determined to be dormant based on previous transactions involving the virtual access device and at least one dormancy rule. Some embodiments may analyze the past transactions of the virtual access device in determining whether the device is dormant. In some embodiments, one or more dormancy rules can be specified by a system administrator defining how to classify a virtual access device as a dormant device. A dormancy rule can specify that a transaction activity level below a certain threshold may be considered a dormant device. For instance, a dormancy rule can specify that a virtual access device is dormant if there were fewer than 3 transactions within the past 6 months. Another dormancy rule can specify that an access device is dormant if the most recent transaction occurred more than a threshold time period ago (e.g., 6 months, a year, 2 years) from a present date. Another dormancy rule can specify that a virtual access device is dormant if the usage frequency (starting from the opening date of the virtual access device) is below a threshold frequency in combination with the most recent transaction being prior to a threshold time interval from a current date. Different embodiments may define different sets of dormancy rules.

Some embodiments may determine whether a virtual access is dormant based on other or additional factors to transaction history. Some embodiments may determine that a virtual access device is dormant even when the physical access device has some activity level. In some such embodiments, the dormancy rule may specify that the virtual access device may be determined to be dormant even when the user is conducting transactions using the physical counterpart device. Certain embodiments may determine that a virtual access device is dormant only when the credentials associated with the device has not been used beyond a threshold period of time, regardless of whether the credentials are stored on the physical or virtual access devices. Different embodiments may determine that a virtual access device is dormant based on a different set of dormancy rules.

Further, some embodiments may determine dormancy of one or more virtual access devices associated with the user by sending a request to an electronic wallet provider. As such, embodiments may determine whether the user's mobile device is still active regardless of the inactivity on the particular virtual card. Upon determining that the user is still using one or more other virtual cards on the mobile device, certain embodiments may determine that the particular virtual card is indeed dormant. Certain embodiments may receive a response from the electronic wallet provider where the response indicates an activity level associated with the one or more virtual access devices associated with the user. The authorization server may then determine whether to renew the virtual access device based on the dormancy response and the response from the electronic wallet provider.

At block 615, the dormancy response indicating that the virtual access device is dormant can be sent to the server. In certain embodiments, an authorization server may determine whether to renew the virtual access device based on the dormancy response. In some embodiments, the authorization server may determine not to renew the virtual access device based on the dormancy response. As such, the token service provider need not generate a new token for the renewal of the virtual access device. In some embodiments, the new token may be generated by a server computer operated by the token service provider or the transaction processing network. Some embodiments may send the determination of whether a virtual access device is dormant in response to the request for dormancy.

In some embodiments, the dormancy response can include an indication as to whether the device is dormant or an activity level of the device's past transactions. For instance, the dormancy response can be a binary response or it can include a number (e.g., 1-10) or a tag (e.g., high, low, medium) that indicates the device's historical activity level.

Upon receiving the dormancy response that the virtual access device is dormant, the server (e.g., an issuer server) may then determine to close the account and send the user a notification of the device or account closure. In some embodiments, the server may determine whether to close the account associated with the virtual card or to renew the virtual card and re-provision the card onto the user's device based on a number of factors in addition to the virtual access device being dormant.

As described, upon receiving a dormancy response indicating that a virtual access device is dormant, the issuer (e.g., an authorization server) can be caused to cease a renewal of the virtual access device. In some embodiments, the issuer can be cause to cease the renewal upon receiving an additional dormancy response from a wallet provider (e.g., where the dormancy response indicates that the mobile application provided by the wallet provider or the user's other access devices being hosted by the wallet provider are dormant). Causing the issuer to cease a renewal can include causing the issuer to mark the virtual access device as "not to renew" or "skip" such that when the issuer performs bulk renewals, the issuer computer skips the virtual access device. In certain embodiments, causing the issuer computer to cease the renewal (e.g., by marking the virtual access device in a database) can thereby save the issuer computing from having to provision a new virtual access device onto the user's mobile device.

In some embodiments, upon receiving the dormancy request from the authorization server, a server that is part of the transaction processing network can send a message to a user associated with the virtual access device inquiring whether to keep the virtual access device active. The server may receive a response indicating that the user does not want to keep the virtual access device active. In this instance, the server may then send the response to the authorization server and enable the authorization server to determine whether to renew the virtual access device based on the dormancy response the response from the user.

In some embodiments, the authorization server may be caused to cease the renewal of a virtual access device based on the dormancy of the mobile application and/or one or more of the other virtual access devices associated with a user in addition to the dormancy of a particular virtual access device of the user. Embodiments may determine the dormancy of the mobile application and/or one or more other virtual access devices being hosted by the mobile application.

Some embodiments may determine that at least one of the mobile application or one or more other virtual access devices being hosted by the mobile application is not dormant. Embodiments may then send the determination that at least one of the mobile application or other virtual access devices is not dormant to the authorization server, and thereby cause the authorization server to provision a new virtual access device onto the mobile device, the new virtual access device replacing the virtual access device.

The issuer computer (or the authorization computer) may perform the determination as to whether to renew various virtual access devices for millions and billions of users, where each virtual access device is slated to be renewed at some point. After identifying those virtual devices that should still be renewed, the issuer computer may then proceed to renew and provision those virtual access devices while leaving the virtual access devices determined to not be renewed alone or closing those virtual access devices. Instead of auto-renewing those virtual access devices that have been flagged, the authorization computer would cease to renew those virtual access devices.

By identifying those that need not be renewed, there would no longer be a need to provision (and possibly re-provision due to repeated failed attempts) an updated virtual access device onto the user's mobile device. By not attempting to re-provision a new virtual access device onto the user's mobile device, computing resources can be saved and potential systemic crashes due to peak load can be prevented. Enabling the authorization computer to determine that the authorization computer no longer needs to re-provision an updated virtual access device onto a user's mobile device can allow the authorization computer to devote its computing resources to other tasks and minimize any unnecessary processing expenditures.

As there are millions and potentially billions of access devices being issued by an issuer each year, there can be billions of renewals that are due for any particular year. By identifying those virtual access devices that need not be renewed (e.g., where there is no longer a use to the user and that the user would not use the virtual access device whether it is renewed or not), the number of new tokens that need to be requested by an authorization server may be reduced. This, in turn, can significantly reduce the processing load on the token service provider (operated by a transaction processing network, or in some instances an issuer) and the authorization server (operated by the issuer). Furthermore, instances of issuers and transaction processing networks crashing due to peak load during which too many renewal requests are being made at certain times of the day or year can also be drastically reduced.

VII. Computer System

Figure 7:
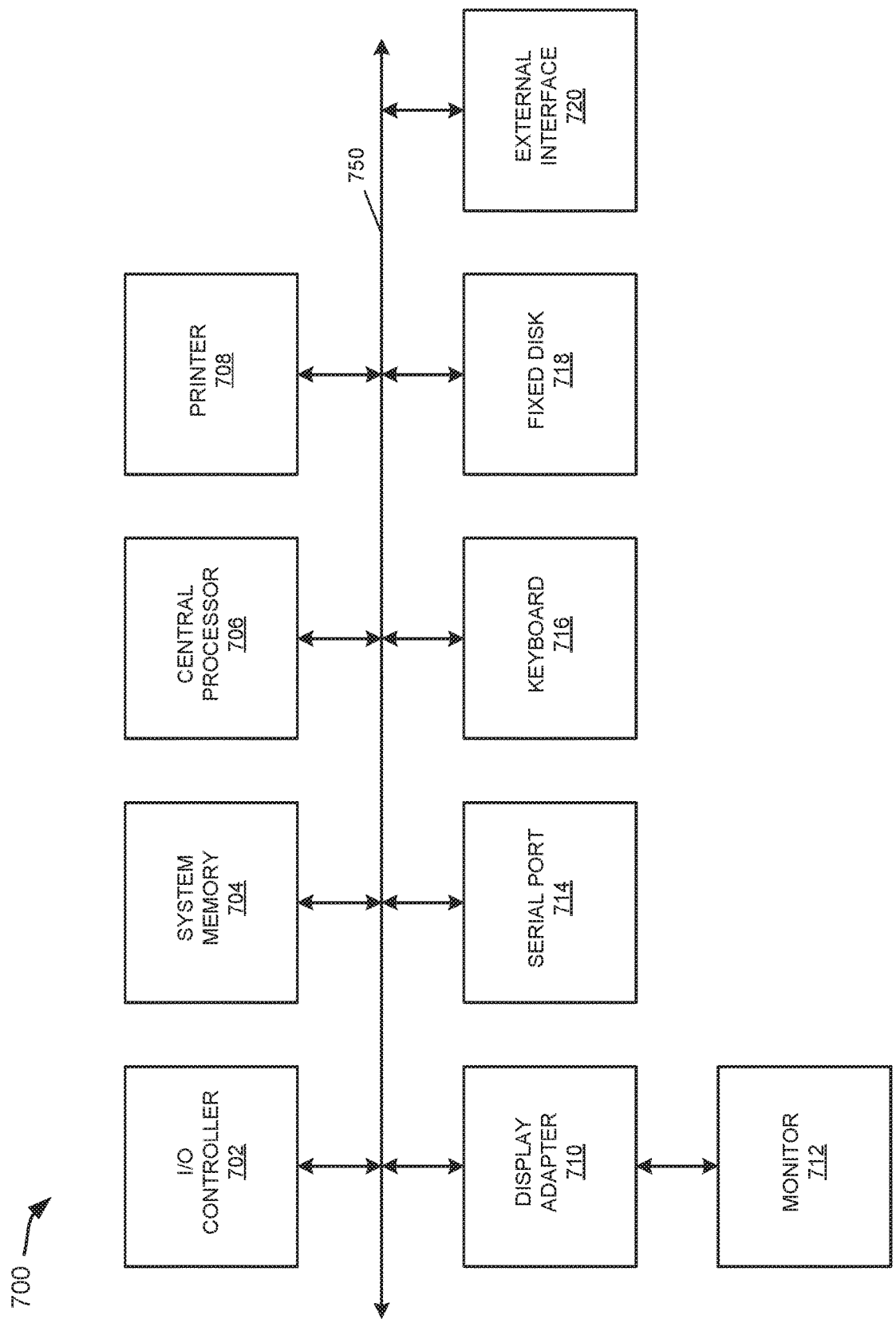
FIG. 7 shows a block diagram of a computer apparatus.

FIG. 7 is a high level block diagram of a computer system 700 that may be used to implement any of the entities or components described above. The subsystems shown in FIG. 7 are interconnected via a system bus 750. Additional subsystems include a printer 708, keyboard 716, fixed disk 718, and monitor 712, which is coupled to display adapter 710. Peripherals and input/output (I/O) devices, which couple to I/O controller 702, can be connected to the computer system by any number of means known in the art, such as a serial port. For example, serial port 714 or external interface 720 can be used to connect the computer apparatus to a wide area network such as the Internet, a mouse input device, or a scanner. The interconnection via system bus 700 allows the central processor 706 to communicate with each subsystem and to control the execution of instructions from system memory 704 or the fixed disk 718, as well as the exchange of information between subsystems. The system memory 704 and/or the fixed disk may embody a computer-readable medium.

Embodiments of the invention have a number of advantages. For example, in embodiments of the invention, efficiency and efficacy can be improved for a provisioning system. Instead of automatically attempting to renew every virtual payment device when a corresponding physical payment device is renewed, virtual payment devices can be renewed selectively. For example, virtual payment devices may be renewed if they are active, or if the consumer indicates a desire to continue using the virtual payment device. This improves over-the-air provisioning success rates, and prevents wasting effort on attempting to provision virtual payment devices for consumers that will not use them, to mobile devices that are no longer being used, and to mobile applications that have been deleted. This also prevents building excessive processing load and potential system crashes due to repeated attempts to provision virtual payment devices to mobile devices and applications that are no longer active.

Further advantages include driving consumer engagement. For example, in some embodiments, a virtual payment device may not be renewed unless the consumer requests renewal, such that the consumer regularly engages with the issuer. Also, promotional offers and other incentives can be provided to the consumer during such engagements in order to promote usage.

As described, the inventive service may involve implementing one or more functions, processes, operations or method steps. It should be understood that the present invention as described above can be implemented in the form of control logic using computer software in a modular or integrated manner. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computing system comprising:
   at least one processor and at least one memory coupled to the at least one processor, the at least one memory storing instructions, which when executed by the at least one processor cause the at least one processor to:
   send a dormancy request to a transaction processing computer, the dormancy request including information identifying a virtual access device, wherein the transaction processing computer determines that the virtual access device is dormant based at least on previous transactions involving the virtual access device and at least one dormancy rule; and
   receive a dormancy response from the transaction processing computer indicating that the virtual access device is dormant,
   wherein the instructions, which when executed by the at least one processor further cause the at least one processor to:
   determine whether to renew the virtual access device based on the dormancy response, and wherein renewing the virtual access device comprises provisioning an updated virtual access device to a mobile device with the virtual access device.

2. The computing system of claim 1, wherein the instructions, which when executed by the at least one processor further cause the at least one processor to:
   cease a renewal of the virtual access device based on the dormancy response.

3. The computing system of claim 1, wherein a dormancy rule in the at least one dormancy rule specifies that the virtual access device is determined to be dormant when a previous transaction occurred more than a threshold time period ago.

4. A computing system comprising:
   at least one processor and at least one memory coupled to the at least one processor, the at least one memory storing instructions, which when executed by the at least one processor cause the at least one processor to:
   send a dormancy request to a transaction processing computer, the dormancy request including information identifying a virtual access device, wherein the transaction processing computer determines that the virtual access device is dormant based at least on previous transactions involving the virtual access device and at least one dormancy rule; and
   receive a dormancy response from the transaction processing computer indicating that the virtual access device is dormant,
   wherein the virtual access device is associated with a mobile application running on a mobile device, wherein the transaction processing computer determines a dormancy of at least one of the mobile application or one or more other virtual access devices being hosted by the mobile application, and wherein the instructions, which when executed by the at least one processor further cause the at least one processor to:
   cease a renewal of the virtual access device based on the dormancy response and the dormancy of at least one of the mobile application, or one or more of the other virtual access devices.

5. A computing system comprising:
   at least one processor and at least one memory coupled to the at least one processor, the at least one memory storing instructions, which when executed by the at least one processor cause the at least one processor to:
   send a dormancy request to a transaction processing computer, the dormancy request including information identifying a virtual access device, wherein the transaction processing computer determines that the virtual access device is dormant based at least on previous transactions involving the virtual access device and at least one dormancy rule; and
   receive a dormancy response from the transaction processing computer indicating that the virtual access device is dormant,
   wherein the virtual access device is associated with a user, wherein the transaction processing computer determines a dormancy of one or more virtual access devices associated with the user by sending a request to an electronic wallet provider, wherein the transaction processing computer receives a response from the electronic wallet provider, the response indicating an activity level associated with the one or more virtual access devices associated with the user, and wherein the instructions, which when executed by the at least one processor further cause the at least one processor to:
   determine whether to renew the virtual access device based on the dormancy response and the response from the electronic wallet provider.

6. The computing system of claim 1, wherein the transaction processing computer sends a message to a user associated with the virtual access device inquiring whether to keep the virtual access device active, wherein the transaction processing computer receives a response indicating that the user does not want to keep the virtual access device active, wherein the transaction processing computer sends the response from the user to the computing system, and wherein the instructions, which when executed by the at least one processor further cause the at least one processor to:
   receive, from the transaction processing computer, the response from the user; and
   determine whether to renew the virtual access device based on the dormancy response and the response from the user.

7. The computing system of claim 1, wherein a physical access device corresponds to the virtual access device, and wherein both the physical access device and the virtual access device enable a user to obtain access to a building.

8. The computing system of claim 1, wherein the instructions, which when executed by the at least one processor further cause the at least one processor to:
   determine not to renew the virtual access device based at least on the dormancy response, and wherein the transaction processing computer thereby need not generate a new token for a renewal of the virtual access device.

9. A computing system comprising:
   at least one processor and at least one memory coupled to the at least one processor, the at least one memory storing instructions, which when executed by the at least one processor cause the at least one processor to:
   send a dormancy request to a transaction processing computer, the dormancy request including information identifying a virtual access device, wherein the transaction processing computer determines that the virtual access device is dormant based at least on previous transactions involving the virtual access device and at least one dormancy rule; and
   receive a dormancy response from the transaction processing computer indicating that the virtual access device is dormant, wherein the virtual access device is associated with a mobile application running on a mobile device, wherein the transaction processing computer determines that at least one of the mobile application or one or more other virtual access devices being hosted by the mobile application is not dormant, and wherein the instructions, which when executed by the at least one processor further cause the at least one processor to:
receive the determination that at least one of the mobile application or other virtual access devices is not dormant from the transaction processing computer; and
provision a new virtual access device onto the mobile device, the new virtual access device replacing the virtual access device.

10. A method comprising:
sending, by a server computer, a dormancy request to a transaction processing computer, the dormancy request including information identifying a virtual access device, wherein the transaction processing computer determines that the virtual access device is dormant based at least on previous transactions involving the virtual access device and at least one dormancy rule;
receiving, by the server computer, a dormancy response from the transaction processing computer indicating that the virtual access device is dormant; and
determining whether to renew the virtual access device based on the dormancy response, and wherein renewing the virtual access device comprises provisioning an updated virtual access device to a mobile device with the virtual access device.

11. The method of claim 10, further comprising:
determining whether to renew the virtual access device based on the dormancy response.

12. The method of claim 10, further comprising:
ceasing a renewal of the virtual access device based on the dormancy response.

13. The method of claim 10, wherein a dormancy rule in the at least one dormancy rule specifies that the virtual access device is determined to be dormant when a previous transaction occurred more than a threshold time period ago.

14. A method comprising:
sending, by a server computer, a dormancy request to a transaction processing computer, the dormancy request including information identifying a virtual access device, wherein the transaction processing computer determines that the virtual access device is dormant based at least on previous transactions involving the virtual access device and at least one dormancy rule; and
receiving, by the server computer, a dormancy response from the transaction processing computer indicating that the virtual access device is dormant,
wherein the virtual access device is associated with a mobile application running on a mobile device, wherein the transaction processing computer determines a dormancy of at least one of the mobile application or one or more other virtual access devices being hosted by the mobile application, and wherein the method further comprises:
ceasing a renewal of the virtual access device based on the dormancy response and the dormancy of at least one of the mobile application or one or more of the other virtual access devices.

15. A method comprising:
sending, by a server computer, a dormancy request to a transaction processing computer, the dormancy request including information identifying a virtual access device, wherein the transaction processing computer determines that the virtual access device is dormant based at least on previous transactions involving the virtual access device and at least one dormancy rule; and
receiving, by the server computer, a dormancy response from the transaction processing computer indicating that the virtual access device is dormant,
wherein the virtual access device is associated with a user, wherein the transaction processing computer determines a dormancy of one or more virtual access devices associated with the user by sending a request to an electronic wallet provider, wherein the transaction processing computer receives a response from the electronic wallet provider, the response indicating an activity level associated with the one or more virtual access devices associated with the user, and wherein the method further comprises:
determining whether to renew the virtual access device based on the dormancy response and the response from the electronic wallet provider.

16. The method of claim 10, wherein the transaction processing computer sends a message to a user associated with the virtual access device inquiring whether to keep the virtual access device active, wherein the transaction processing computer receives a response indicating that the user does not want to keep the virtual access device active, wherein the transaction processing computer sends the response from the user to the server computer, and wherein the method further comprises:
receiving, from the transaction processing computer, the response from the user; and
determining whether to renew the virtual access device based on the dormancy response and the response from the user.

17. The method of claim 10, wherein a physical access device corresponds to the virtual access device, and wherein both the physical access device and the virtual access device enable a user to obtain access to a building.

18. The method of claim 10, further comprising:
determining not to renew the virtual access device based at least on the dormancy response, and wherein the transaction processing computer thereby need not generate a new token for a renewal of the virtual access device.

19. A method comprising:
sending, by a server computer, a dormancy request to a transaction processing computer, the dormancy request including information identifying a virtual access device, wherein the transaction processing computer determines that the virtual access device is dormant based at least on previous transactions involving the virtual access device and at least one dormancy rule; and
receiving, by the server computer, a dormancy response from the transaction processing computer indicating that the virtual access device is dormant,
wherein the virtual access device is associated with a mobile application running on a mobile device, wherein the transaction processing computer determines that at least one of the mobile application or one or more other virtual access devices being hosted by the mobile application is not dormant, and wherein the method further comprises:
receiving the determination that at least one of the mobile application or other virtual access devices is not dormant from the transaction processing computer; and provisioning a new virtual access device onto the mobile device, the new virtual access device replacing the virtual access device.

\* \* \* \* \*